United States Patent [19]

Bleha, Jr.

[11] 4,343,535

[45] Aug. 10, 1982

[54] LIQUID CRYSTAL LIGHT VALVE

[75] Inventor: William P. Bleha, Jr., Carlsbad, Calif.

[73] Assignee: Hughes Aircraft Company, Culver City, Calif.

[21] Appl. No.: 103,683

[22] Filed: Dec. 14, 1979

[51] Int. Cl.³ .............................................. G02F 1/135
[52] U.S. Cl. ................... 350/342; 350/339 F; 350/347 R
[58] Field of Search ................. 350/342, 339 F, 347 R

[56] References Cited

U.S. PATENT DOCUMENTS

| 4,019,807 | 4/1977 | Boswell et al. | 350/342 |
| 4,124,278 | 11/1978 | Grinberg et al. | 350/342 |
| 4,127,322 | 11/1978 | Jacobson et al. | 340/342 X |
| 4,191,456 | 3/1980 | Hong et al. | 350/342 X |

*Primary Examiner*—Edward S. Bauer
*Attorney, Agent, or Firm*—Gerald B. Rosenberg; W. H. MacAllister; W. J. Bethurum

[57] ABSTRACT

Method of and apparatus for operating an electro-optical system for producing high quality images from a liquid crystal light valve.

A polarized projection beam is directed to the reflective surface of a liquid crystal light valve for polarization modulation by means of an input image. The beam is polarization analyzed to thereby generate an output image which typically suffers from color and brightness defects caused by economically unavoidable tolerance variations in the electro-optical system. A second beam of light is generated having a light of a selected color different from the projection beam, is spatially varied in intensity by a spatially graded filter, and super-imposed on the output image so as to eliminate the color and brightness defects as well as enhance color contrast and brightness of the image. The color of the second beam is selected so as to mask background color variations and improve color contrast on the output image while the graded intensity filter is selected to additively compensate for background brightness variation of the output image.

23 Claims, 3 Drawing Figures

LIQUID CRYSTAL LIGHT VALVE

TECHNICAL FIELD

This invention relates generally to liquid crystal light valve image display systems, and in particular to such systems in which otherwise wasted light from a projection source, after being selectively modulated in intensity and spectrally filtered, is combined with an image display to enhance image quality.

BACKGROUND OF THE INVENTION

Liquid crystal image display systems have been increasingly used for display of graphic, symbolic, and TV pictorial images. Among the advantages of such display devices are high brightness, large scale display capabilities, compact size, and high resolution.

As is well known, the liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer and to the dielectric mirror. An input image of low intensity light, such as that generated by a cathode ray tube, is applied to the photoresponsive layer thereby switching the electric field across the electrodes from the photoresponsive layer onto the liquid crystal layer to activate the liquid crystal.

Linearly polarized projection light passing through the liquid crystal layer and reflecting from the dielectric mirror is polarization-modulated in accordance with the information incident on the photoconductor. Upon exiting the light valve, the light is converted by means of a crossed polarizer to an intensity-modulated beam which is projected by a lens onto a screen. In practice, the polarizing and analyzing functions are accomplished by a single polarizing beamsplitter. The intensity of the projected image has a point-to-point correspondence to the intensity of the writing light input image. Therefore, if a complex distribution of light, for example, a high resolution input image, is focused onto the photoconductor surface, the device converts that image into a high brightness replica which can be projected with high magnification to produce a high brightness image on a viewing screen.

This operation is further described in U.S. Pat. No. 4,019,807 issued to D. Boswell et al on Apr. 26, 1977, and assigned to the assignee of the present invention.

A graphics display projector using a liquid crystal light valve of the above type is described in an article entitled "Application of the Liquid Crystal Light Valve to a Large Screen Graphics Display", published in the 1979 Society for Information Display (SID), International Symposium, Digest of Technical Papers, May 1979, pp. 22-23. This display system, a type with which the present invention is particularly but not exclusively concerned, projects a large scale image having yellow-alpha numeric characters on a blue background. The colors are a result of the unavoidable fact that the liquid crystal material polarization modulates the white projection light incident upon it as a function of the wavelength of the light. Although providing an image of high brightness and high resolution, the system has several inherent drawbacks which it is the object of the present invention to minimize if not eliminate. One drawback stems from the fact that the light valve is a complicated, expensive device that includes numerous microscopically thin film layers deposited on super-flat substrates, each requiring a series of critical manufacturing steps. Among these steps, the two substrates which sandwich the few micrometerthick liquid crystal layer must be polished over their approximately five centimeter faces to an optical flatness of better than approximately one-quarter the wavelength of white light or 0.15 micrometers. Additionally, the device must be assembled so that these two optically flat substrates, to define the liquid crystal layer thickness, are separated by precisely several micrometers and uniform from point to point to within a fraction of a micrometer. As will be further described, the nematic (rod-like) liquid crystal molecules comprising this layer are arranged in chains which are precisely oriented in twist and tilt angles to the substrates.

The difficulty of producing such a complicated sutructure within the required tolerances results in a large percentage of defective liquid crystal valves, thus raising their effective unit cost. In effect, variations in the liquid crystal layer thickness, caused by both surface waviness and wedging of the substrate surfaces which contain the liquid crystal material, create poor uniformity of the image background color. Non-uniform twist and tilt of the liquid crystal molecules in their off-state also gives rise to color nonuniformities in the image background. An additional cause of such uneven color is residual birefringence within the polarizing beam splitter. This residual birefringence can occur from manufacturing imperfections as well as from nonuniform heating by the heat sources within the image projector package, such as electronics and the high intensity projection light source. In particular, as a consequence of the variations in liquid crystal tilt and twist variations in the liquid crystal layer thickness, the image background will appear not in the desired uniform shade of blue, but rather with spatial variations in brightness and in color. These color variations typically ranging from violet to magenta and green, create a very distracting visual effect, thereby interfering with effective communication.

In addition to the above described limitations caused by manufacturing tolerances, another limitation is the strong dependence of display background color on liquid crystal layer thickness. Thus, the desirable color contrast of yellow characters on a blue background is achieved only by using a relatively thick liquid crystal layer of from approximately six to eight micrometers. Because the time response of the liquid crystal layer varies as the square of its thickness, the blue color is achieved at the expense of unsmeared video rate images. Although video rate images can be produced with a thinner liquid crystal layer of from approximately three to four micrometers, the disadvantage is that the background color, being controlled by the thickness of the liquid crystal, appears black with yellow characters. This color combination not only gives a relatively low color contrast, but is visually unpleasing.

A still further limitation is that even though a given device may have a uniform blue background, the blue can vary in shade from device to device.

SUMMARY OF THE INVENTION

Accordingly, it is an object of the present invention to provide a means for improving the performance of image display arrangements using a reflective liquid crystal light valve operating in the polarization modulation mode.

A further object of the present invention is to provide such a means to display an image having both a high color contrast and video repetition rate.

A still further object of the invention is to provide a means to increase the manufacturing yield of liquid crystal light valves by inexpensively compensating for their manufacturing defects.

Yet another object of the invention is to provide a liquid crystal light valve graphics display having an image of increased brightness.

It is also an object of the invention to provide a means for correcting non-uniformities in background brightness in an image from such a liquid crystal light valve projector.

These and other objects and advantages are achieved in an improved image display system wherein a beam of unpolarized light is directed to a polarizing beamsplitter which separates it into two beams having mutually orthogonal polarization directions. The beamsplitter directs the first beam to the reflective surface of a liquid crystal light valve for polarization modulation with an input image and reflection back to the beamsplitter to thereby generate a polarization-analyzed output image having non-uniform background color and brightness caused by tolerance variations in the display system. The second beam is converted by a spectral filter into light of a color different from the projection beam, spatially varied in intensity by a spatially graded neutral density filter, altered in polarization direction by a phase retardation means and redirected to the beamsplitter so as to combine with the modulated projection beam to form a composite beam. The composite beam is projected by a lens onto a screen so as to superimpose the second beam onto the output image. The color of the second beam is selected so as to mask color variations and improve color contrast of the output image. The graded intensity filter is selected to compensate for background brightness variations of the output image.

BRIEF DESCRIPTION OF THE DRAWINGS

These and other objects, features and advantages of the invention will be more fully apparent from the following detailed description taken in conjunction with the accompanying drawings wherein like reference characters refer to like parts throughout and in which.

DETAILED DESCRIPTION OF THE INVENTION

The above-referenced Boswell patent discusses in detail the construction, theory, and operation of the hybrid field-effect liquid crystal light valve used in the present invention. For purposes of completeness, the patent is incorporated by reference herein. Because this element is vital to an understanding of the present invention, a brief explanation of this light valve will now be presented.

Figure 1A:
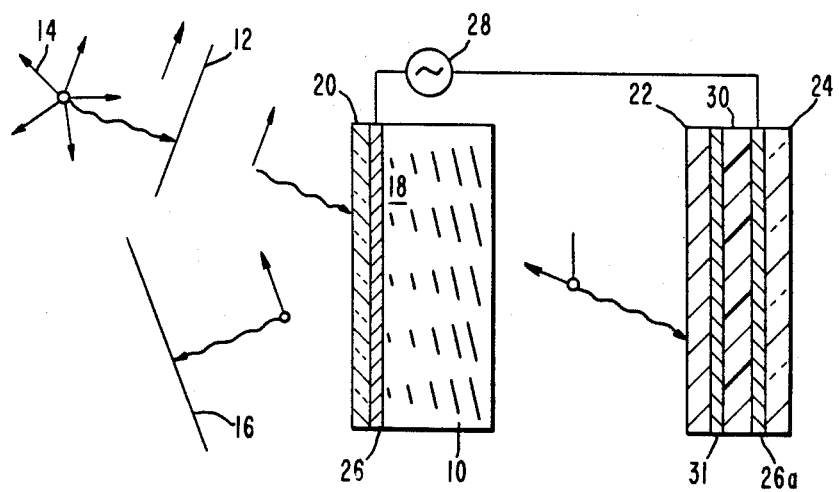
FIGS. 1a and 1b respectively illustrate the off-state and on-state operation of the conventional liquid crystal light valve used in the present invention.
Figure 1B:
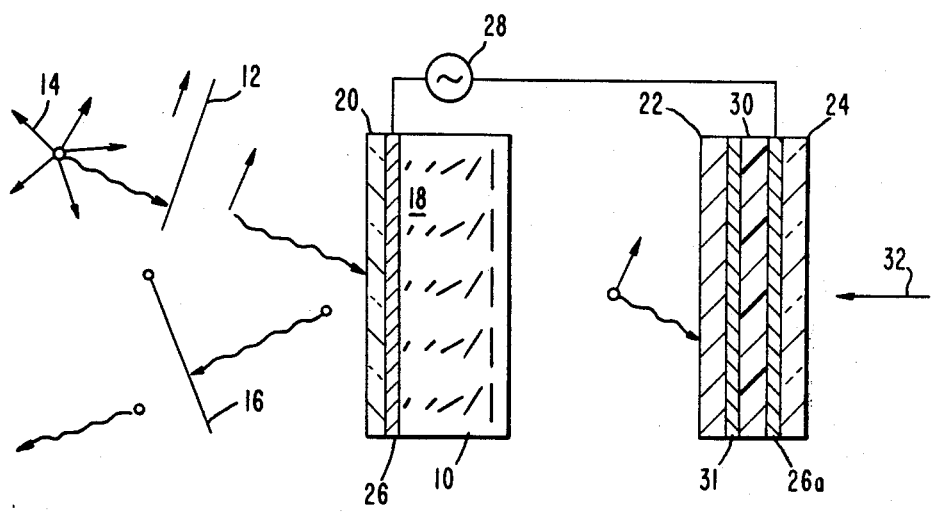

FIGS. 1a and 1b respectively illustrate the operation of the dark off-state and transmitting on-state of a conventional reflective type polarization light valve. Although the light rays are shown at angle to the normal to the light valve surface for the sake of clarity, in actual practice these rays are directed along the normal. In FIG. 1a, a polarizer 12 is placed between an illumination source 14 and the light valve 10 while a crossed analyzer 16 is placed in the path of the reflected beam. The liquid crystal light valve 10 is formed by confining a layer of liquid crystal material 18 between the transparent front plate 20 and dielectric mirror 22 located on backplate 24 here shown separate for clarity of illustration. A transparent electrode 26 is located on the inner surface of transparent front plate 20, and a similar transparent electrode 26a is on the inner surface of backplate 20. Transparent electrodes 26 and 26a are connected to an alternating voltage bias source 28. Located on the transparent electrode 26a on the surface opposite from backplate 24 is a layer 30 on photoresponsive material such as cadmium sulfide. Between the dielectric mirror 22 and photoresponsive layer 30 is placed a visible light blocking layer 31, typically cadmium telluride, to isolate the photoresponsive layer 30 from the projection light.

In the absence of imaging illumination, most of the voltage falls across the photoresponsive layer 30. In this condition, the liquid crystal is below its threshold for electro-optic activation. When imaging light in the spectral range from 520 to 550 nanometers illuminates the cadmium sulfide photoresponsive layer 30, the impedance of this layer drops and a voltage pattern corresponding to the image information is switched to the liquid crystal layer 18, thereby activating the liquid crystal.

The liquid crystal molecules of layer 18 are aligned in a twisted alignment configuration when the voltage across the liquid crystal is below its activation threshold. In this configuration, the long axes of the molecules adjacent to each electrode are oriented in a preferred direction which is fabricated into each electrode surface. The twisted (helical) alignment configuration is obtained by rotating the preferred direction on the two parallel opposed electrodes at a 45° angle so that the molecules in the bulk of the liquid crystal layer twist through the 45° angle to form a partial helix whose axis is perpendicular to the two electrodes.

In addition, the long axes of the molecules are tilted approximately 5° from the plane of the electrodes so that all molecules tilt in the same direction in the on-state.

Prior art alignment techniques for orienting molecules in these preferred directions include preparation of the substrate surfaces in contact with the liquid crystal material by shallow angle ion beam etching, or grazing angle deposition of inert insulating material. In the preferred alignment technique, two layers of $SiO_2$ are deposited at a grazing angle as is described by Meyerhofer in *Applied Physics Letters*, Vol. 29, No. 11, Dec. 1, 1976.

A dark off-state occurs when the twisted liquid crystal structure rotates the polarization direction of the incident linearly polarized beam by 45° on a single pass-through. Upon reflection from the dielectric mirror 22, the light retraverses the liquid crystal and its direction of polarization is then rotated 45° in the opposite direction. Thus, the polarization direction of the reflected beam is rotated back to the polarization direction of the incident light. The analyzer 16, having its axis perpendicular to the polarizer axis, thereby blocks the linearly polarized beam to produce a dark off-state.

Referring now to FIG. 1b, a voltage above a threshold is applied to the liquid crystal 18 by applying light 32 from an input image to the photoresponsive layer 30. As the voltage is applied, the molecules begin to tilt toward the perpendicular to the electrode surfaces. As the molecules tilt, the helical structure begins to untwist.

Reorientation of the formally twisted molecules of the liquid crystal changes the birefringence of the liquid crystal. As a result, the light that emerges from the hybrid field-effect light valve is elliptically polarized and that portion which lies in the plane of the analyzer 16 will be transmitted. Because the polarization modulation of the light by the liquid crystal is sensitive to the wavelength of the light, the color of the transmitted light will vary with applied voltage. The transmitted colors also vary with thickness of the liquid crystal layer. The light intensity of the input image, bias voltage of voltage source 28, and liquid crystal layer thickness are selected to provide yellow characters on a blue background. Further details of the relationship of color transmission characteristics to the voltage across and the thickness of the liquid crystal layer are described in Bleha et al, Proceedings of the 1977 Society for Information Display, International Symposium, pg. 104.

Figure 2:
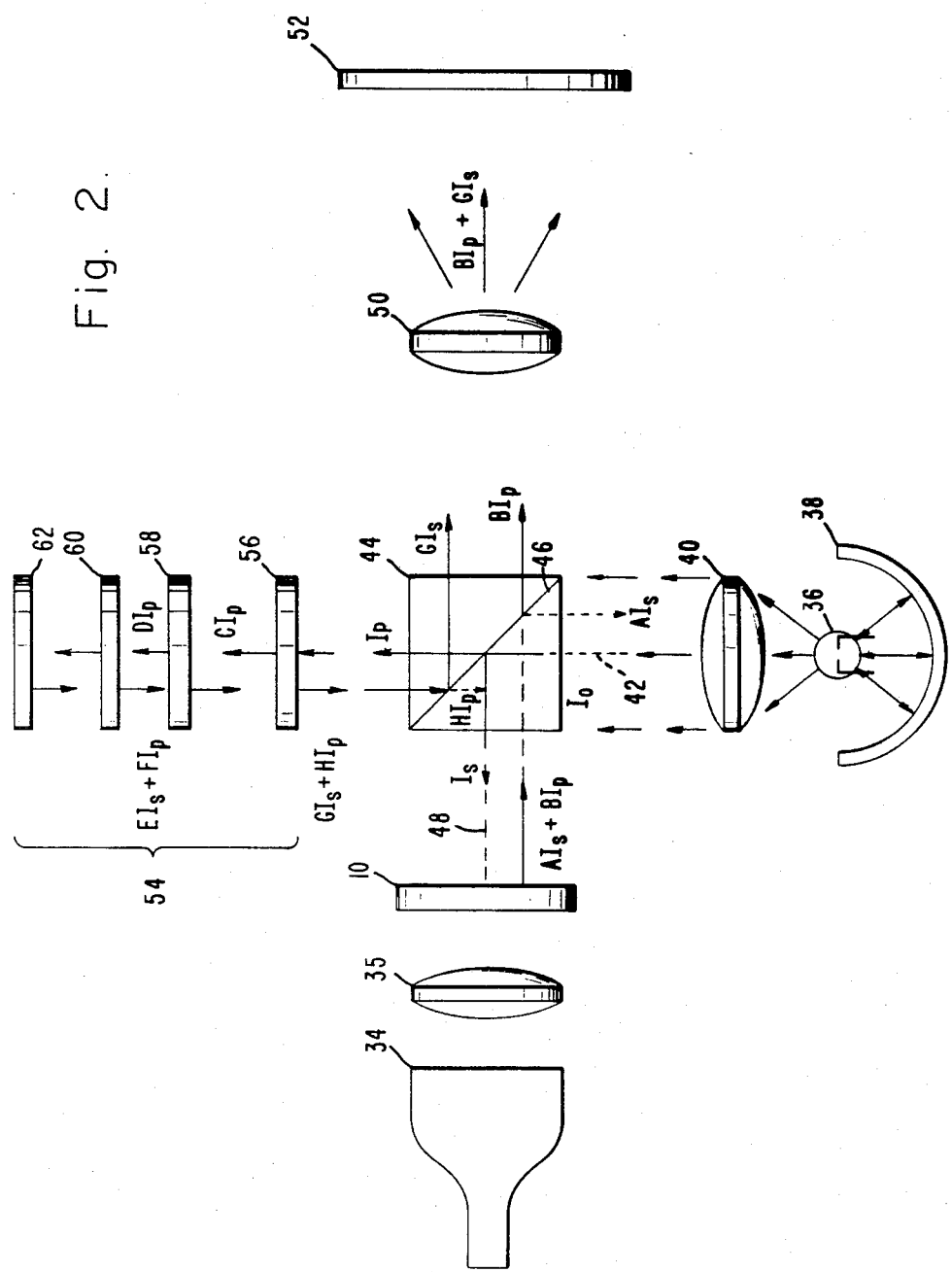
FIG. 2 is an optical schematic of the present invention in plan view illustrating the pertinent optical paths and polarization orientations.

The image projector system of the present invention is shown by way of an optical schematic in FIG. 2. As an introduction to the detailed description of the invention which follows, the image to be projected is first displayed on a relatively low intensity cathode ray tube (CRT) 34. This image is optically coupled by any of a number of standard means such as a fiber optic plate or a relay lens 35 to a reflective field effect light valve 10. As discussed earlier, the liquid crystal light valve acts as a light modulator in the sense that incident polarized light, when reflected from the surface of the light valve, will experience a spatially distributed change of polarization proportional to the phosphor emission intensity on the screen of the CRT 34 to which the light valve is coupled. A polarizing beamsplitter prism 44 serves to both polarize and to analyze the projection light from a high intensity source 36, suitably a xenon arc lamp, to separate the light into two beams and then to relay the two respective light beams to the light valve 10 and to an image enhancer 54. Prism 44 further serves to recombine these two beams into a single beam which is projected by means of a projection lens 50 onto a projection screen 52.

The xenon arc lamp light source 36 emits unpolarized light $I_O$ which is reflected from a collecting mirror 38 and formed into a parallel beam of white light by a collimating lens 40. This collimated beam of unpolarized white light $I_O$ travels along a first optical axis 42 into the polarizing beamsplitter prism 44 normal to its surface and, in a preferred embodiment, at approximately 45° to the polarizing beamsplitter layer 46.

The polarizing beamsplitter 44 is preferably a polarization selective and light dividing device having multilayer dielectric coatings of the type described in U.S. Pat. No. 3,403,731 issued to MacNeille. As disclosed in the MacNeille patent, a plurality of dielectric layers of appropriate index of refraction and thicknesses may be deposited at the interface between the two halves of the glass cube comprising prism 44 so that the layer 46 forms a 45° angle with the intercepting sides of a cube. In operation, the polarizing beamsplitter layer 46 transmits the component of light in the P polarization state (polarization vector in the plane of FIG. 2 and perpendicular to the direction of propagation) but reflects the light component in the S polarization state (polarization vector perpendicular to the plane of FIG. 2).

After the light beam $I_O$ enters prism 44, the light intercepts the beamsplitter layer 46 at approximately 45°. The S polarization state component $I_S$ is reflected by beamsplitter layer 46 along a second optical axis 48 which orthogonally intercepts the first optical axis 42. The light is incident on the reflecting face of liquid crystal light valve 10. Where the screen of CRT 34 has no phosphor emission and is therefore dark, the corresponding area of the light valve 10 remains in its offstate and the light is reflected from the light valve 10 with its polarization unchanged back to the polarizing prism 44. Because polarization of the light is unchanged from its original S state, the light is again reflected from beamsplitter layer 46 and returns to the light source 36 with the result that the light valve area imaged by projection lens 50 on porjection screen 52 appears dark. However, if phosphor areas of the screen of CRT 34 are bright, some or all of the light reflected from the light valve 10 is rotated from the S to the P polarization state. This component $BI_p$, proportional to the intensity of the CRT screen, will pass through the beamsplitter layer 46 to projection lens 50 to form a bright image on projection screen 52. The remaining component $AI_S$ is reflected from beamsplitter layer 46 and directed back towards source 36 and is lost.

As described thus far, the image projected on screen 52 has the brightness and color limitations described earlier. In accordance with the present invention, however, there is additionally provided in the projector system an optical image enhancer 54 comprising graded neutral density filter 56, spectral filter 58, a phase retardation means such as a retardation plate 60 and a mirror 62. As will become apparent, the image enhancer 54 minimizes, if not eliminates, these limitations.

Now considering the operation of image enhancer 54, the P state component $I_p$ of the unpolarized light beam $I_O$ passes through the beamsplitter layer 46 and is incident upon the graded neutral density filter 56 having a graded or spatially varying transmissivity selected so as to compensate for any brightness spatial variation otherwise present in the image projected on screen 52.

Graded filter 56 is positioned an optical path distance from projection lens 50 such that it is imaged approximately on screen 52. Areas of minimum and maximum transmission are fabricated in filter 56 to respectively compensate the brightest and dimmest regions of the image display projected from light valve 10 onto screen 52. In this manner, an image display is produced on screen 52 having a uniformly bright background.

In actual practice, it is not necessary to place the image of graded filter 56 precisely at screen 52. Rather, it may be desirable to slightly defocus the filter image for the reason that if small blemishes and dust particles are present on filter 56, precise imaging would objectionably superimpose the defects in highly magnified size upon the image display. However, by slightly defocusing the filter image, such small defects can be rendered imperceptible, while at the same time creating a negligible change in the desired image of the transmission pattern of filter 56 projected on screen 52.

Spatially graded filters are conventionally made by depositing a metallic coating on a glass substrate. They are available in virtually any specified spatial transmission pattern from a number of suppliers, including OCLI, Santa Rosa, Calif.

The spatially graded beam $CI_p$ is then transmitted through a blue (in a preferred embodiment) dichroic filter 58 to form blue beam $DI_p$. Dichroic filter 58 is coated with a wavelength selective coating which transmits the blue component of the white incident projection light and rejects the other color components by reflecting them back towards the light source 36. Such a dichroic filter is a standard item produced by a number of vendors including OCLI, Santa Rosa, Calif.

One of the features of the present invention is the discovery that superimposing a beam of light having a spatially uniform, specific color onto the image produced by a liquid crystal display system having the earlier described tolerancing defects results in an enhancement of both the color uniformity and color contrast of the image. In particular, when the spectral filter 58 has a passband centered in the blue spectral region, the background color and color contrast is predominantly controlled by the filter. The resulting beneficial image color enhancement effects include:

1. masking the spatial color variations otherwise present;
2. increasing the reproducibility of image background color from system-to-system;
3. increasing color contrast by causing the yellow characters to appear whiter, and the background to appear the shade of blue required for optimum contrast;
4. allowing the substitution of the thin layer, hance fast response time, liquid crystal light valve for the thick layer, slow response light valve to thereby achieve the desired color contrast of yellow-white characters on a blue background while achieving video framing rates.

Spectral filter 58 can be fabricated to have any one of an unlimited number of spectral transmission characteristics to not only eliminate various image color defects, but also to match color backgrounds among different light valves. Furthermore, once fabricated a given filter can be color-tuned to shorter wavelengths by tilting the filter. A further advantage of tilting the filter is to direct any unwanted reflections of residual S polarized light which is transmitted by beamsplitter layer 46 away from the projection screen 52.

The retardation plate 60 converts the incident beam $DI_p$ into circularly or elliptically polarized light, either left or right handed. A subsequent reflection of this beam from a conventional mirror 62 at approximately normal incidence reverses the direction of the circular or elliptical polarization, for example, from left to right handed polarization. After retraversing through the retardation plate 60, the polarization direction is now rotated so that at least some of the P state light is converted into an S state component $EI_s$. The beam thus formed consists of the respective S and P components, $EI_s$ and $FI_p$. This beam is further filtered by again passing through spectral filter 58 and graded filter 56 to thereby form beam $GI_s$ and $HI_p$. As is apparent to one of ordinary skill in the technology, the double pass of the light through filters 56 and 58 must be taken into account when the filter characteristics are selected. The S-state beam component $GI_s$ is directed by mirror 62 so that it is reflected from beamsplitter layer 46 and projected by lens 50 to superimpose an intensity-graded, blue background on the image formed by light valve 10 on projection screen 52.

Retardation plate 60 customarily made of mica or quartz, is available from a number of vendors, and in mica from Melles Griot as Catalog No. 02-WRM-005. In a preferred embodiment, the retardation plate has a thickness corresponding to a quarter-wave retardation for blue light.

The intensity of the blue light projected on porjection screen 52 is easily adjusted by rotation of the quarter-wave plate 60 in its own plane; that is, when the optic axis of the retardation plate is 45° to the incoming P polarization, the above described double pass through the plate 60 results in the incident P polarized light being rotated by 90° so that it is entirely in the S polarization state. This results in a maximum brightness projected to the screen. If on the other hand, the quarter-wave plate is rotated so that its optic axis is parallel to the incoming P polarized light, the light passes through the quarter-wave plate essentially unchanged and exits with the same polarization as it had upon entering the plate. In this situation, the light then passes through the beamsplitter layer 46 with the result that no blue light is projected onto the screen. Intermediate orientations of the quarter-wave plate produce intermediate intensities. As is thus apparent, rotating the quarter-wave plate 60 provides an easy and fast way of adjusting the intensity of the blue background light reaching projection screen 52. In this manner, light intensity is optimally adjusted so that the color nonuniformities otherwise present in the image from light valve 10 are masked and, in addition, the brightness of the image display increased.

In an operational embodiment of the projector system described above, a liquid crystal light valve having a 3.4 micrometer thick liquid crystal layer for TV repetition rate response times was used to produce an image having a black off state with yellow on state characters. This was done with the background light blocked. When unblocked, the additional blue light, produced with a spectral filter having a passband centered at a wavelength of approximately 450 nm, made the yellow characters whiter and masked color nonuniformities on the background. The display appeared significantly brighter, approximately 30, than without the additional blue light. Image contrast loss caused by superimposing the background light over the characters was barely perceptible. The quarter-wave plate was rotated to adjust the intensity of the blue background to obtain optimum color uniformity with a 30% increase in image brightness.

Among the advantages of the invention described above is that the unique and novel configuration of the quarter-wave plate, graded filter, and blue filter provides an effective method of increasing the manufacturing yield of expensive liquid crystal light valves by compensating simply and cheaply for variations in color and brightness. Furthermore, by retrieving projection light otherwise lost, the brightness of the display is considerably enhanced.

Although the present invention has been shown and described with references to a particular embodiment, nevertheless, various changes and modifications which are obvious to a person skilled in the art to which the invention pertains are deemed to lie within the spirit and scope of the invention.

What is claimed is:

1. In a method for displaying an image wherein an input image modulates a polarized projection beam with a polarization modulation liquid crystal light valve to generate an output image, the improvement comprising the steps of:
(a) generating a beam of light;
(b) spatially grading the intensity of said beam;

(c) combining said spatially graded beam with said modulated projection beam to form a composite beam; and (d) projecting said composite beam with a lens onto a screen so as to superimpose said beam onto said output image and to thereby compensate for brightness non-uniformities in said output image.

2. A method as defined in claim 1 further characterized by the step of converting said beam into light having a color different from the color of said projection beam, said converting being done prior to forming said composite beam.

3. A method as defined in claim 2 further characterized by the step of converting said beam into blue light.

4. A method as defined in claims 1, 2 or 3 further characterized by the step of forming said polarized projection beam from white light.

5. In a system for displaying an image wherein an input image modulates a polarized projection beam with a polarization modulation liquid crystal light valve to generate an output image, the improvement comprising:

(a) means for generating a beam of light;

(b) means for spatially grading the intensity of said beam, said means including a neutral density filter having a spatially varying transmissivity;

(c) means for combining said spatially graded beam with said modulated projection beam to form a composite beam; and (d) means for projecting said composite beam onto a screen so as to superimpose said beam onto said output image and to thereby compensate for brightness non-uniformities in said output image.

6. A system as defined in claim 5 further characterized by means for converting said beam into light having a color different from the color of said projection beam, said converting being done prior to forming said composite beam.

7. A system as defined in claim 6 wherein said color converting means is further characterized by means for converting said beam into blue light.

8. A system as defined in claims 5, 6 or 7 further characterized by means for forming said polarized projection beam from white light.

9. In a system for displaying an image wherein a beam of unpolarized white light is directed to a polarizing beamsplitter for separating into a first beam and a second beam respectively having first and second mutually orthogonal polarization directions, and for directing said first beam to the reflective surface of a liquid crystal light valve for polarization modulation with an input image, said first beam reflecting back to said polarizing beamsplitter to be polarization analyzed and transmitted to a lens for projecting an output image onto a screen, the improvement comprising:

(a) means for altering the polarization of said second beam including means for reflecting said second beam back to said polarizing beamsplitter so as to combine the altered portion of said second beam having its polarization component in said first polarization direction with the polarization modulated portion of said projection beam to thereby form a composite beam for projection by said lens to superimpose said second beam on said output image;

(b) a spectral filter positioned within said second beam for converting said second beam into light having a color different from said white projection beam, said color selected so as to enhance the color characteristics of said output image; and (c) a graded neutral density filter positioned within said second beam so as to be approximately imaged by said lens onto said output image, the spatial variation of the transmissivity of said neutral density filter being selected so as to enhance the brightness characteristics of said output image.

10. The system as defined in claim 9 wherein said spectral filter converts said second beam into blue light.

11. The system as defined in claim 10 wherein said means for altering polarization comprises a quarter-wave retardation plate positioned so that said second beam is transmitted through said plate to a mirror which reflects said second beam back through said plate.

12. In a method for displaying a high-intensity output image wherein a low-intensity input image modulates a high-intensity polarized projection beam by means of a polarization modulation liquid crystal light valve to generate a high-intensity output image beam, a method of enhancing the output image quality comprising the steps of:

(a) generating a high-intensity beam of light;

(b) filtering said beam of light with a graded neutral density filter having a spatially varying transmissivity selected so as to compensate for any background spatial intensity variation otherwise present in said high-intensity output image beam; and (c) combining said filtered beam of light with said high-intensity output image beam to form a composite beam whereby the brightness and background brightness uniformity of said output image are enhanced.

13. The method of claim 12 further comprising the step of filtering said beam of light with a spectral filter to establish a desired background color for said output image beam prior to combining said beam of light with said image beam so that the color contrast between said output image and said background is enhanced.

14. The method of claim 13 wherein said background color is selected to be in the blue spectral region.

15. The method described in claim 12, 13, or 14 characterized further in that:

(a) said high-intensity beam of light is generated by a high-intensity light source and a polarizing beamsplitter, said beamsplitter producing two mutually orthogonally polarized beams from said light source, the first being said polarized projection beam and the second being said high-intensity beam of light; and (b) the step of combining said filtered beam of light with said output image beam includes the steps of altering the polarization of a portion of said beam of light to that of said polarized projection beam and of directing said polarization altered beam of light back towards said polarizing beamsplitter.

16. In a liquid crystal light valve projection system wherein a low-intensity input image modulates a high-intensity polarized projection beam by means of a polarization modulation liquid crystal light valve to generate a high-intensity output image beam, an image enhancer comprising:

(a) means for generating a high-intensity beam of light;

(b) a spectral filter for establishing a desired background color for said output image beam;

(c) means for directing said beam of light through said filter; and (d) means for combining the resulting filtered beam of light with said output image beam to form a composite beam whereby the background color uniformity of the projected output image is enhanced.

17. In a liquid crystal light valve projection system wherein a low-intensity input image modulates a high-intensity polarized projection beam by means of a polarization modulation liquid crystal light valve to generate a high-intensity output image beam, an image enhancer comprising:
(a) means for generating a high-intensity beam of light;
(b) a graded neutral density filter having a spatially varying transmissivity selected so as to compensate for any background spatial intensity variation otherwise present in said high-intensity output image beam;
(c) means for directing said beam of light through said filter; and
(d) means for combining the resulting filtered beam of light with said output image beam to form a composite beam whereby the brightness uniformity of the output image is enhanced.

18. A system as defined in claim 17 further comprising a spectral filter for establishing a desired background color for said output image beam, said light directing means also directing said beam of light through said spectral filter.

19. The system as defined in claim 17 or 16 further characterized in that:
(a) said means for generating said high-intensity beam of light includes a high-intensity light source and a polarizing beamsplitter for producing two mutually orthogonally polarized beams from said light source, the first being said polarized projection beam and the second being said high-intensity beam of light; and
(b) said means for directing said beam of light includes a retardation plate and mirror for altering the polarization of a portion of said beam of light to that of said polarized projection beam and for directing said beam of light back towards said polarized beamsplitter.

20. A system as defined in claim 19 wherein said retardation plate has a thickness corresponding to a quarterwave retardation for the mean frequency of said beam of light.

21. A system as defined in claim 20 wherein said spectral filter has an optical passband centered in the blue spectral region.

22. In a liquid crystal light valve projection system wherein a polarizing beamsplitter is used to separate unpolarized white light into first and second mutually orthogonally polarized beams, said first being directed to the reflective surface of a liquid crystal light valve and back through said beamsplitter to be analyzed and projected, an image enhancer comprising:
(a) a graded neutral density filter having a spatially varying transmissivity selected so as to compensate for any background intensity spatial variation otherwise present in said reflected first beam;
(b) a spectral filter having an optical passband centered in the blue spectral region; and
(c) a retardation plate and mirror for altering the polarization of a portion of said second beam to that of said first beam and for directing said second beam through said graded neutral density and spectral filters and back to said beamsplitter, the polarization altered portion of said second beam being further directed by said beamsplitter to form a composite beam with said analyzed first beam thereby providing a projected image having high image brightness, uniform background color, and increased color contrast.

23. The system of claim 22 wherein said retardation plate has a thickness corresponding to a quarterwave retardation for blue light.

* * * * *